United States Patent [19]

Scholz

[11] 4,293,869
[45] Oct. 6, 1981

[54] CIRCUIT FOR REDUCING DROP-OUT ERRORS IN A VIDEO SIGNAL DERIVED FROM A RECORDING DEVICE

[75] Inventor: Werner Scholz, Gehrden, Fed. Rep. of Germany

[73] Assignee: TED Bildplatten Aktiengesellschaft, Switzerland

[21] Appl. No.: 41,623

[22] Filed: May 23, 1979

[30] Foreign Application Priority Data

May 26, 1978 [DE] Fed. Rep. of Germany ....... 2822873

[51] Int. Cl.³ .................... H04N 5/76; H04N 5/795
[52] U.S. Cl. ........................ 358/8; 358/127; 360/36; 360/38
[58] Field of Search .......... 360/33, 36, 38; 358/4, 358/8, 127–132

[56] References Cited

U.S. PATENT DOCUMENTS

| | | | |
|---|---|---|---|
| 3,947,873 | 3/1976 | Buchan | 360/38 |
| 4,054,903 | 10/1977 | Ninomiya | 358/8 |
| 4,063,284 | 12/1977 | Tatami | 358/127 |
| 4,081,826 | 3/1978 | Ninomiya | 358/8 |

FOREIGN PATENT DOCUMENTS 52-15224  2/1977  Japan ..................... 360/38

Primary Examiner—Raymond F. Cardillo, Jr.
Attorney, Agent, or Firm—McGlew and Tuttle

[57] ABSTRACT

A device for producing a switching pulse used to compensate for dropout in a video signal received from a recording apparatus and for compensation of time error in the video signal, comprising, a manipulated variable producing device within the recording apparatus, a transit time section having an input connected to the recording apparatus for receiving the video signal produced thereby and the manipulated variable and a dropout recognition device having an input connected to the recording apparatus for receiving the video signal and an output connected to the input of the transit time section. The dropout recognition device produces a flag signal which corresponds to a dropout which may occur in the video signal. The output of the dropout recognition means containing the flag signal is connected to a first switching device which, in turn, is connected to the input of the transit time section for forming a marking pulse which has the duration of the flag signal in the video signal. A second switching device is connected at the output of the transit time section for sensing the marking pulse and producing the switching pulse which is time-corrected and used for impressing an equivalent voltage in the video signal to replace the dropout therein.

13 Claims, 3 Drawing Figures

CIRCUIT FOR REDUCING DROP-OUT ERRORS IN A VIDEO SIGNAL DERIVED FROM A RECORDING DEVICE

FIELD AND BACKGROUND OF THE INVENTION

The present invention relates to apparatus for correcting interferences in video signals in general and, in particular, to a new and useful device for producing a switching pulse which is used to replace a portion of a video signal which has been distorted by a dropout in recording medium used to reproduce the video signal. The apparatus also includes means for correcting time errors in the reproduced video signal.

DESCRIPTION OF THE PRIOR ART

In the recording of a video signal, for example, on a magnetic tape or a video disc, a main interference occurring during reproduction are the so-called dropouts. These are blemishes or imperfections in the magnetic tape or in the video disc which cause a break in the scanned signal and black or white spots in the line direction of a reproduced picture, depending on the type of modulation.

It is known from German Offenlegungsschrift 14 12 531, to determine such breaks in the scanned signal with a blemish detector, and to derive therefrom a manipulated variable which inserts an equivalent signal into the video signal during the duration of the interference. This manipulated variable controls, for example, a switch which is normally applied to the output of a reproduction unit, and to the output of an equivalent signal source in the case of an interference.

A fixed DC voltage can be used as an equivalent signal which corresponds to a picture half of the video signal. It is also known to obtain the equivalent signal by integration of the video signal, so that its amplitude adapts itself to the mean picture brightness.

It is also known to use, as an equivalent signal, the signal of a preceding line or a combination of signals from several successive lines. In a TRIPAL reproduction circuit with three-line delay lines (German Offenlegungsschrift, that is DOS No. 26 10 090), it is advisable to tap the equivalent signal corresponding to the signal repetition period of three lines, behind the third delay line existing in the TRIPAL circuit. These equivalent signals yield a particularly effective compensation because the signals, following each other in close succession, mostly differ only slightly from each other.

Other errors caused in a video signal produced by a recording device are the so-called time errors caused by speed fluctuations of the recording medium.

In order to eliminate these errors, it is known from German Auslegungsschrift, that is, DAS No. 21 22 592, to arrange an electronically controllable transit time section in the path of the video signal, e.g., a bucket chain. The transit time thereof is controlled by a manipulated variable derived from the time error in such a way that the time error is reduced.

The circuit for compensation of dropout effects and the circuit for compensation of time errors can thus be used simultaneously side-by-side for the solution of different problems in the reproduction of a recorded video signal. However, the following difficulty may appear in this simultaneous application.

A flag signal or pulse is obtained in the dropout compensation circuits when a dropout occurs. This effects the insertion of the equivalent signal in the above-described manner. It is advisable to generate this flag signal from the signal ahead of the transit time section used to compensate for time errors. In practice, it is not advantageous to derive this flag signal directly from the video signal, but from the carrier frequency modulated with the video signal. This carrier, however, no longer exists in the transit time section, because the transit time section is primarily suitable for the transmission of video signals.

In addition, obtaining the flag signal from the dropout at the output of the transit time section is a disadvantage, because the band width is limited by the transit time section itself.

On the other hand, however, dropout compensation with use of the flag signal behind the transit time section is advantageous for various reasons. This is the case, for example, in a reproduction circuit for a triple-line sequential color video signal with two or three delay lines for each line duration, since these delay lines can then be utilized in the above-described manner to obtain the equivalent signal. However, these delay lines are arranged behind the transit time section for time error compensation, because the time-error corrected signal is preferably already fed to these delay lines.

If the time errors were compensated behind the TRIPAL reproduction circuit, that is, in the composite color signal available at that point, the color carrier frequency would be constantly changed. In addition, the band width of the controllable transit time section would have to meet high standards to transmit the color carrier frequency (4.43 MHz).

The same considerations also apply to another color recording method where the reduced chrominance carrier in the reproduction circuit must be separated from the luminance signal by means of a comb filter. Here, the one-line delay line must be arranged for the above-indicated reasons between the FM-modulator and the reproduction circuit.

If it is desired to use the flag signal obtained ahead of the controllable transit time section for the dropout compensation proper, behind the transit time section, the flag signal must be correspondingly delayed so that the dropout compensation takes place at the correct time. A constant delay of the flag signal is not possible because the delay of the video signal in the transit time section depends on the respective time error and is thus undefined.

It would be conceivable to use a second transit time section for the flag signal, e.g., a second bucket chain, which is controlled by the same timing pulse sequence depending on the frequency of the time error. This solution, however, is too expensive because of the high price of such transit time sections.

SUMMARY OF THE INVENTION

The present invention is based on a solution for the problem of delaying the flag signal obtained at the input of the transit time section, by the correct amount, without the use of a second transit time section.

Accordingly, an object of the present invention is to provide a device for producing a switching pulse used to compensate for dropout in a video signal from a recording apparatus and for compensation of time error in the video signal, comprising, means connected to the recording apparatus for producing a manipulated variable which is a function of time error in the video signal, a transit time section having an input connected to the recording apparatus for receiving the video signal and the manipulated variable for producing a time-corrected video signal at an output thereof, dropout recognition means having an input connected to the recording apparatus for receiving the video signal and producing a flag signal at an output thereof upon the occurrence of a dropout in the video signal, first switch means connected between said dropout recognition means output and said transit time section input for producing a marking pulse in the video signal before it reaches said transit time section to form a time-corrected video signal with time-corrected marking pulse at said transit time section output, and second switch means connected to said transit time section output to produce the switch pulse from said time-corrected marking pulse.

A further object of the present invention is to provide a method for producing a switching pulse used to compensate for dropout in a video sinal from a recording apparatus and for compensation of time error in the recording signal, comprising, the steps of: producing a manipulated variable corresponding to time error in the video signal, producing the video signal from the recording apparatus, correcting time errors in the video signal using the manipulated variable, forming a flag pulse corresponding to a dropout in the video signal, using the flag pulse to produce a marking pulse in the video signal before the video signal is time-corrected, to form a time-corrected video signal with time-corrected marking pulse, and using the time-corrected marking pulse to form the switching pulse which is used for compensation of dropout in the video signal.

Accordingly, in the invention, the time error compensation without an existing transit time section, that is, a bucket chain, is used additionally to delay the flag pulse or signal. Due to this, an additional time transit section is unnecessary. This also ensures that the flag pulse always undergoes the same delay, in a desired manner, depending on the respective time error in the video signal. Exactly that time, during which the desired signal is unusable, is used for transmitting the flag pulse. It is this time period into which the equivalent signal must be later inserted.

A further object of the present invention is to provide a circuit for reducing dropout interference in a video signal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
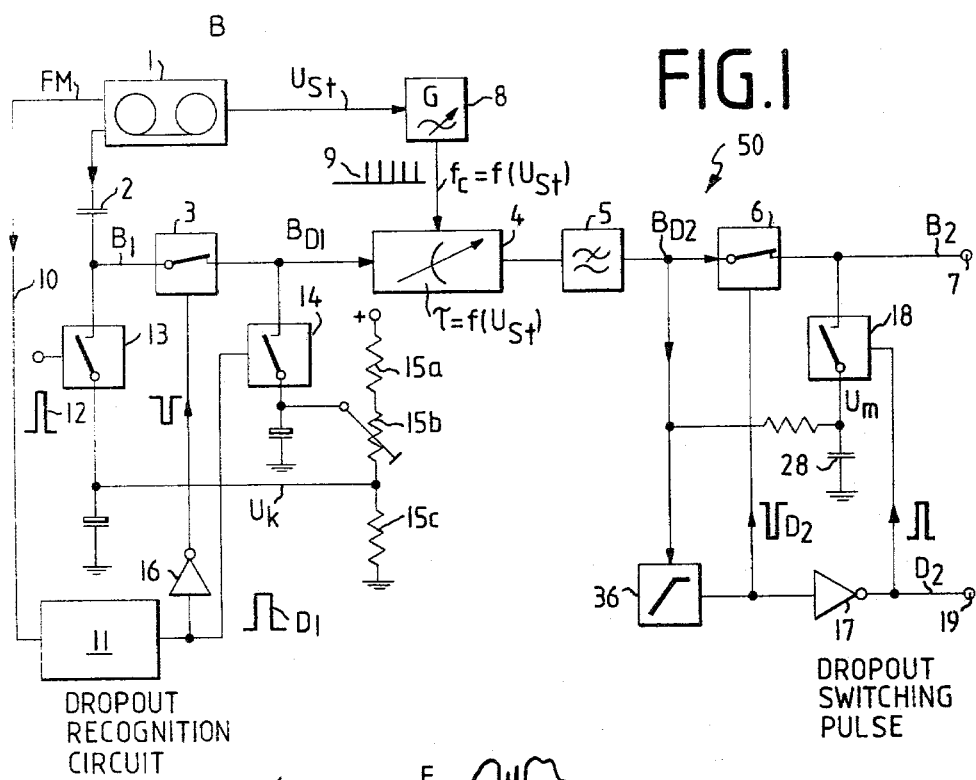
FIG. 1 is a principal schematic and block circuit diagram of the invention.

Referring now to the drawings in particular, the invention embodied therein in FIG. 1, comprises, a device, generally designated 50, for producing a switching pulse $D_2$ used to compensate for dropout 20 (see FIG. 2) in a video signal $B_1$ from a recording means or apparatus 1 and for compensation of time error in the video signal, comprising, means connected to or within the recording apparatus 1 for producing a manipulated variable $U_{St}$ which is a function of time error in the video signal. A transit time section or means 4 is connected to the video signal coming from the recording apparatus 1 and the manipulated variable for producing a time-corrected video signal as hereinafter to be described. Dropout recognition means 11 are also provided, which are connected between the output of recorder 1 and the input of the transit time section 4.

First switching means in the form of switches 3 and 14 are connected between the dropout recognition means 11 and the transit time section 4 for producing a marker in the video signal which corresponds to a dropout therein. At the output of transit time section 4, a second switch means in the form of switch 6 and 18 is provided for sensing the marking pulse within the time-corrected video signal and producing a switching pulse $D_2$ which is used, as also later described, to insert an equivalent or corrected video signal into the main video signal for replacing the dropout portion thereof.

In FIG. 1, a wanted video signal $B_1$ arrives at terminal 7 as a corrected video signal $B_2$ from a recording device 1. Signal $B_1$ thus travels over capacitor 2, switch 3, transit time section 4 which is controllable in its transit time, low pass filter 5, and switch 6 to reach terminal 7. A manipulated variable $U_{St}$, which controls the frequency of a clock generator 8, is obtained from the time errors in recording device 1 in a known manner, not shown.

Generator 8 produces a timing pulse sequence 9 with a frequency $f_c$ which depends on the time error. This pulse sequence controls the transit time of the transit time section 4 to the extent needed so that the time errors in video signal $B_1$ are eliminated. The manipulated variable $U_{St}$ is obtained from the video signal, e.g., with a circuit according to DOS No. 25 24 521. The transit time section 4 is a bucket chain, a charge-coupled device (CCD) memory or the like. The remaining elements are all known to those skilled in the art.

Recording device 1 feeds, in addition, the FM-carrier, modulated with the video signal, over line 10 to a dropout recognition circuit 11, which generates in or during a dropout 20 (FIG. 2) in signal $B_1$, the flag signal or pulse $D_1$. Circuit 11 works according to DOS No. 26 41 978, for example. At the input of switch 3, signal $B_1$ is clamped by a scanning pulse 12 applied to a switch 13, with the synchronous bottom according to FIG. 2 at voltage $U_k$, and appears thus with a defined DC voltage position as video signal $B_{D1}$ at the input of transit time section 4. Voltage $U_k$ is tapped from resistance chain 15a, 15b and 15c. In dropout 20, flag pulse $D_1$ opens switch 3 over a gate 16, so that the wanted video signal $B_1$ is disconnected from the input of transit time section 4.

At the same time, flag pulse $D_1$ closes a switch 14 and connects video signal $B_{D1}$ to voltage value $U_D$, which is outside the amplitude range normally occupied by signal B, namely, in the region of ultrawhite. The value $U_D$ is adjustable by means of a potentiometer 15b. In this way, a marking pulse M is produced in the video signal $B_{D1}$ (see FIG. 2)

Figure 2:
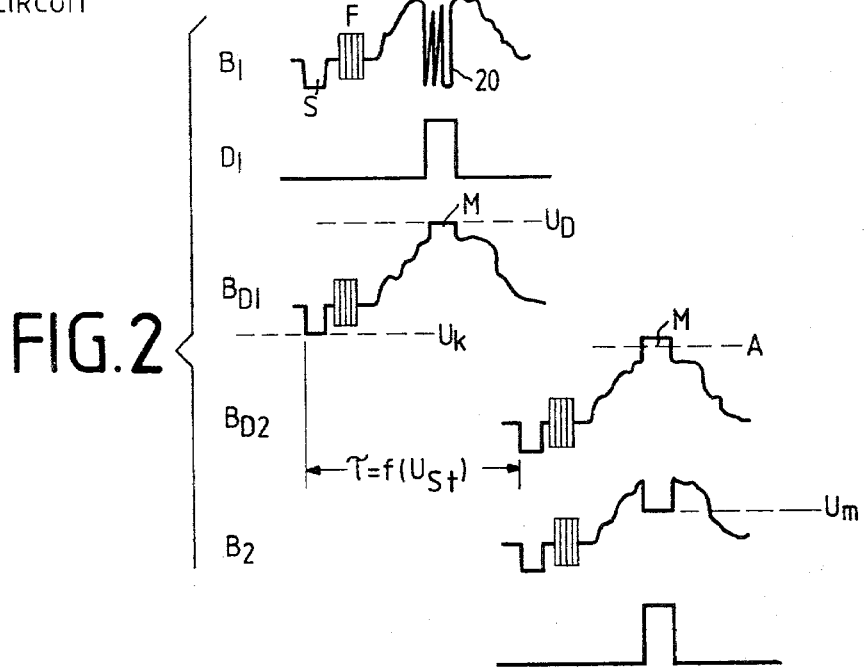
FIG. 2 is a time correlated showing of the signals appearing at different points of the circuit in FIG. 1.

A signal $B_{D2}$ appears at the output of transit time section 4. The signal is delayed by the value ($\tau$) corresponding to the time error which, in turn contains the marking pulse M. A switching pulse $D_2$ is obtained with an amplitude-dependent cutoff circuit 36. As seen in FIG. 2, this pulse $D_2$ corresponds to the threshold value A in signal $B_{D2}$. This pulse opens switch 6 so that the transmission of video signal $B_{D2}$ to terminal 7 is interrupted. At the same time, pulse $D_2$ closes a switch 18 over a gate 17 and connects the video signal to a voltage value $U_m$. Voltage value $U_m$ is obtained with filter section 28 from signal $B_{D2}$ and corresponds to the mean picture brightness. Switching pulse $D_2$ at terminal 19 then serves, in a manner not shown here, to insert the equivalent signal during the dropout 20. A circuit for dropout compensation by means of switching pulse $D_2$ is described, for example, in German Pat. No. 2,148,486.

The switching of video signal $B_{D2}$ to the voltage value $U_m$ is not absolutely necessary, since, in any event, the voltage value in the video signal is eliminated during the duration of the dropout in the dropout compensation proper.

In FIG. 2 B indicates the signal behind the FM-demodulator in a color recording method with a reduced color carrier. F is the color burst reduced to the lower color carrier frequency. In a TRIPAL circuit, the color burst F, shown in FIG. 2, is nonexistent. The clamping in stage 13 in FIG. 1 can then also be effected on the rear black shoulder, so that the voltage $U_m$ is at the level of the black value of signal $B_1$.

Figure 3:
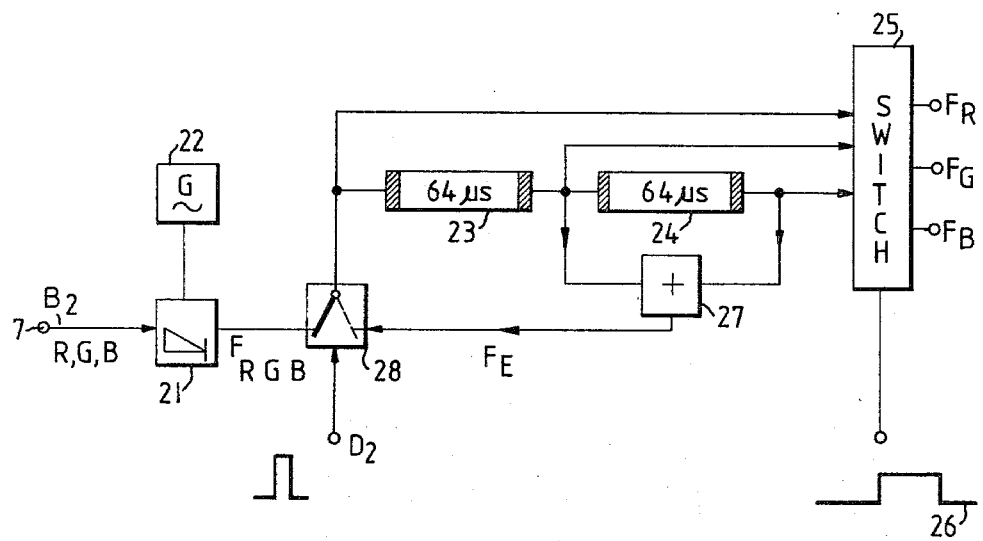
FIG. 3 is a block diagram of an application of the circuit according to the invention to a TRIPAL reproduction circuit.

FIG. 3 shows the utilization of switching pulse $D_2$ in a TRIPAL reproduction circuit. There, the video signal $B_2$, which alternately represents line-by-line, the color signals R, G, B (red, green and blue) arrives in modulator 21, in which it is modulated to a carrier generated in generator 22. In this way, a triple-line sequential color carrier frequency signal $F_{R,G,B}$ is formed which lies in the pass band of two-line delay lines 23, 24. Lines 23, 24, as well as three-line frequency-operated switches 25, serve to transform the triple line sequential signal $F_{R,G,B}$ into three simultaneous signals $F_R$, $F_G$ and $F_B$ at the outputs of switch 25. The latter is actuated by line frequency breaking voltages 26. Such a circuit is described in detail in German Pat. No. 12 61 876.

In adding stage 27, an equivalent signal $F_E$ is obtained by adding the signal delayed by one line duration and the signal delayed by two line durations which arrives at the input of switch 28. With a trouble-free signal $F_{R,G,B}$, switch 28 is in the left position, so that this signal arrices unchanged in delay line 23 and switch 25. In a dropout, pulse $D_2$ switches the switch into the right position, so that the equivalent signal $F_E$ appears now at the output of the switch and there replaces the error signal during this time. This circuit is described more fully in German Pat. No. 2,148,486.

While specific embodiments of the invention have been shown and described in detail to illustrate the application of the principles of the invention, it will be understood that the invention may be embodied otherwise without departing from such principles.

What is claimed is:

1. A circuit for reducing drop-out errors in a video signal from a video recording apparatus comprising:

first switch means connected to the video recording apparatus for receiving the video signal and for receiving a marker pulse, said first switch means having at least one control input;

transit time means connected to said first switch means for receiving and passing at least one of the video signal and the marker pulse with a controllable transit time;

drop-out recognition means connected between the video recording apparatus and said first switch means control input for producing a flag signal with the occurrence of drop-out in the video signal, the flag signal operating on said first switch means control input to pass the marker pulse to said transit time means;

detection means connected to said transit time means for detecting the marker pulse and producing a switching pulse;

second switch means connected to said transit time means and having a control input connected to said detection means for receiving the switching pulse; and signal forming means connected to said second switch means for producing an equivalent signal, said second switch means passing the equivalent signal to an output thereof when the switching pulse is applied to said second switch means control input.

2. A circuit as claimed in claim 1, wherein said first switch means includes a voltage source for producing said marking pulse at an amplitude higher than a normal amplitude of the video signal.

3. A circuit, as claimed in claim 2, wherein higher amplitudes in the video signal correspond to a white image and, wherein, the amplitude of said marking pulse exceeds the normal amplitude in the video signal in the direction of white.

4. A circuit, as claimed in claim 1, wherein said first switch means includes a fixed voltage source and a switch connected between said fixed voltage source and an input of said transit time means which is closed by said flag pulse to impress said fixed voltage onto the video signal during dropout therein.

5. A circuit, as claimed in claim 19, wherein said signal forming means comprises means for injecting an equivalent voltage into the video signal upon the occurrence of a dropout connected to a transit time section output, said second switch means including a switch which is opened by said switching pulse for interrupting the passage of a video signal during said switching pulse and for injecting said equivalent voltage into the video signal for that duration.

6. A circuit, as claimed in claim 1, wherein said signal forming means comprises a filter section, said transit time means having an output connected to said second switch means, said filter section connected to said transit time means output for producing the equivalent signal from the video signal passin said transit time means.

7. A circuit, as claimed in claim 1, wherein said signal forming means is connected to an output of said transit time means and forms the equivalent signal from at least one preceding scan line in the video signal.

8. A circuit, as claimed in claim 1, wherein said transit time means has an output connected to said second switch means, said signal forming means comprising a TRIPAL reproduction circuit, said TRIPAL reproduction circuit comprising two series connected time delay lines each for one scan line period of the video signal, said series connected time delay lines connected to said transit time means output for reproduction of three simultaneous color signals in the video signal, said TRI-PAL reproduction circuit including means for deriving the equivalent signal from said series connected time delay lines.

9. A circuit, as claimed in claim 8, wherein said TRI-PAL reproduction circuit includes adding means connected to an input and an output of one of said time delay lines for producing the equivalent signal.

10. A circuit, as claimed in claim 1, wherein said transit time means comprises an electrically-clocked memory.

11. A circuit, as claimed in claim 10, wherein said electrically-clocked memory comprises a bucket chain.

12. A circuit, as claimed in claim 10, wherein said electrically-clocked memory comprises a charge-coupled device.

13. A method of compensating for drop-out in a video signal from a video signal recording apparatus, comprising:

supplying the video signal to a transit time circuit having a controllable transit time for correcting time errors in the video signal;

disconnecting the video signal from the transit time circuit upon the occurrence of drop-out in the video signal and simultaneously supplying a marker voltage pulse to the transit time circuit;

detecting the occurrence of drop-out in the video signal for disconnecting the video signal from the transit time circuit and for supplying the marker voltage pulse to the transit time circuit;

detecting the video signal and marker voltage pulse coming from the transit time circuit to produce a switching signal corresponding to the occurrence of the marker voltage pulse; and applying an equivalent voltage signal to the video signal upon the occurrence of the switching signal.

* * * * *